(12) United States Patent
Yoshida et al.

(10) Patent No.: US 6,296,754 B1
(45) Date of Patent: Oct. 2, 2001

(54) METHOD OF REDUCING NITROUS OXIDE GAS AND ELECTROLYTIC CELL

(75) Inventors: Yasuki Yoshida; Setsuro Ogata; Yoshinori Nishiki; Shuji Nakamatsu, all of Kanagawa; Hiroshi Inoue; Chiaki Iwakura, both of Osaka, all of (JP)

(73) Assignee: Kabushiki Kaisha Maruzen Create, Tokyo (JP)

( * ) Notice: Subject to any disclaimer, the term of this patent is extended or adjusted under 35 U.S.C. 154(b) by 0 days.

(21) Appl. No.: 09/421,854

(22) Filed: Oct. 20, 1999

(30) Foreign Application Priority Data

Oct. 21, 1998 (JP) .................................................. 10-300019

(51) Int. Cl.$^7$ ....................................................... C25B 1/00
(52) U.S. Cl. ............................................................. 205/551
(58) Field of Search ............................................... 205/551

(56) References Cited

PUBLICATIONS

Otsuka et al., "Reduction of Nitrous Oxide by Electrochemically Generated Spillover Hydrogen", Stud. Surf. Sci. Catal., vol. 77 (New Aspects of Spillover Effect in Catalysis), pp. 117–123. 1993 (no month available), Abstracts only.*

Furuya et al., "Electroreduction of Nitrous Oxide to Nitrogen Using a Gas–Diffusion Electrode Loaded With Various Catalysts", Proc. —Electrochem. Soc., 93–18 (Proceedings of the Symposium on Environmental Aspects of Electrochemistry and Photoelectrochemi, 1993, no month available.*

* cited by examiner

Primary Examiner—Edna Wong
(74) Attorney, Agent, or Firm—Sughrue, Mion, Zinn, Macpeak & Seas, PLLC

(57) ABSTRACT

A method of reducing nitrous oxide which comprises introducing nitrous oxide into a reaction chamber disposed in contact with an electrolytic chamber having an anode and a cathode comprising a hydrogen-absorbing material, the cathode serving as a diaphragm separating the reaction chamber and the electrolytic chamber, and contacting the nitrous oxide with the diaphragm to thereby continuously reduce the nitrous oxide with hydrogen atoms electrolytically generated on the cathode, absorbed by the hydrogen-absorbing material and passing through the diaphragm. The cathode preferably has catalyst comprising a platinum group metal black deposited on the side of the cathode opposite the anode. Also disclosed is an electrolytic cell for the reduction of nitrous oxide partitioned with a diaphragm into an electrolytic chamber having an anode and a reduction reaction chamber, the diaphragm comprising a hydrogen-absorbing material, and the side of the diaphragm facing the electrolytic chamber serving as a cathode.

10 Claims, 2 Drawing Sheets

METHOD OF REDUCING NITROUS OXIDE GAS AND ELECTROLYTIC CELL

FIELD OF THE INVENTION

The present invention relates to a method of reducing nitrous oxide and an electrolytic cell for use therein. More particularly, this invention relates to a method for nitrous oxide reduction by which the excess part of the nitrous oxide gas used as an anaesthetic gas in hospitals is efficiently and continuously decomposed with hydrogen atoms electrolytically generated on a cathode, and to an electrolytic cell for use in the method.

BACKGROUND OF THE INVENTION

Nitrous oxide is used as an anaesthetic gas in hospitals. However, if a doctor or nurse working in an operating room continuously inhales leaked nitrous oxide gas over a prolonged period, there is a fear that the doctor or nurse may have a health disorder. In addition, discharging the nitrous oxide gas ascends to the stratosphere, where it changes into nitrogen monoxide. The nitrogen monoxide reacts with ozone to form a substance which causes ozonosphere depletion like chlorofluorocarbon gases and the like. Furthermore, since nitrous oxide has a coefficient of global warming several hundred times that of carbon dioxide and the life thereof in the atmosphere is as long as about 150 years, it is a substance which exerts considerable influence on global warming. Inhibiting this harmful substance, nitrous oxide, from diffusing into the air is coming to be a future important need in hospitals, etc.

Although the leakage of nitrous oxide into an operating room is attributable to leakage from joints in the anaesthetic apparatus and to the excess discharge of the anaesthetic gas from the apparatus, it is mostly attributable to the latter. The currently employed measures for reducing the concentration of an anaesthetic gas in an operating room include (1) ventilating the room, (2) adsorptively removing the excess anaesthetic gas with activated carbon, (3) discharging the excess anaesthetic gas into the atmosphere with a suction type discharge apparatus, and (4) decomposing the excess anaesthetic gas with a decomposing apparatus after the gas is collected with a suction type discharge apparatus. Among these, method (2) has a drawback in that the amount of nitrous oxide gas adsorbable onto activated carbon is small, while method (3) has a drawback in that discharging the gas outside is undesirable from the standpoint of avoiding global warming. Consequently, method (4) is considered to be the best.

With respect to an apparatus for decomposing nitrous oxide gas, a technique is described in JP-B-1-45487 (the term "JP-B" as used herein means an "examined Japanese patent publication"), in which a catalyst comprising a silica powder having, deposited thereon, both nickel containing a platinum group metal and lanthanum oxide, is packed into a reactor and the gas to be decomposed is passed through the reactor heated at 150 to 550° C. to decompose the same. However, this technique is undesirable in that this treatment is known to yield nitrogen dioxide and nitrogen monoxide, as by-products, which are harmful to the human body and cause environmental pollution. Another drawback thereof is that since the catalyst deteriorates at a high rate under such high-temperature conditions, the catalyst needs to be replaced with a fresh one in a short time period and periodic maintenance is necessary. Furthermore, it is extremely difficult to regenerate the deteriorated catalyst, so that the expense of discarding the catalyst cannot be avoided.

SUMMARY OF THE INVENTION

It is therefore an object of the present invention to provide a method for continuously and easily converting nitrous oxide stably over a long period of time into substances harmless to the human body and the environment.

Another object of the present invention is to provide an apparatus for practicing the above method.

The present invention solves the above-described problems by providing:

(1) A method of reducing nitrous oxide which comprises introducing nitrous oxide into a reaction chamber disposed in contact with an electrolytic chamber having an anode and a cathode comprising a hydrogen-absorbing material, said cathode serving as a diaphragm separating said reaction chamber and said electrolytic chamber, and contacting the nitrous oxide with said diaphragm to thereby continuously reduce the nitrous oxide with hydrogen atoms electrolytically generated on the cathode, absorbed by said hydrogen-absorbing material and passing through said diaphragm.

(2) The method of reducing nitrous oxide as described in (1) above, wherein the cathode comprises a material selected from the group consisting of palladium, palladium alloys and hydrogen-absorbing nickel alloys.

(3) The method of reducing nitrous oxide as described in (2) above, wherein the cathode has a catalyst comprising a platinum group metal black deposited on the side of the cathode opposite the anode.

(4) An electrolytic cell for the reduction of nitrous oxide partitioned into an electrolytic chamber having an anode and a reduction reaction chamber, said diaphragm comprising a hydrogen-absorbing material, and the side of the diaphragm facing the electrolytic chamber serving as a cathode.

DESCRIPTION OF SYMBOLS

Figure 1:
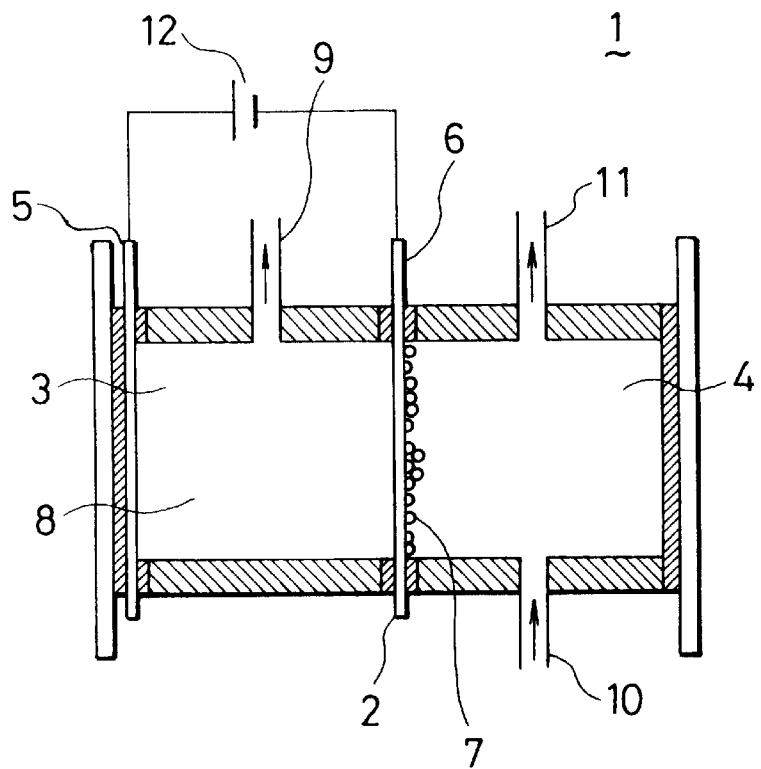
FIG. 1 is a diagrammatic view illustrating one embodiment of the electrolytic cell for nitrous oxide reduction of the present invention.

1 Electrolytic cell
2 Hydrogen-absorbing metal sheet
3 Electrolytic chamber
4 Reduction reaction chamber
5 Anode
6 Cathode
7 Porous catalyst layer
8 Electrolytic solution
9 Gas outlet
10 Waste gas introduction opening
11 Discharge opening
12 Power source

DETAILED DESCRIPTION OF THE INVENTION

Various embodiments of the present invention will be explained below, but the invention should not be construed as being limited thereto.

FIG. 1 is a diagrammatic view illustrating one embodiment of the electrolytic cell for nitrous oxide reduction of the present With this apparatus, one embodiment of the method of reducing nitrous oxide of the present invention can be advantageously carried out.

The electrolytic cell 1 is partitioned into an electrolytic chamber 3 and a reduction reaction chamber 4 with a hydro-absorbing metal sheet 2 in the form of a thin plate or foil, etc. The hydrogen-absorbing metal sheet 2 has a porous catalyst layer 7 on its surface facing the reduction reaction chamber 4. The electrolytic chamber 3 contains an aqueous solution of, e.g., potassium hydroxide, as an electrolytic solution 8. The hydrogen-absorbing metal sheet 2 is connected to a power source 12, and its side facing the electrolytic chamber 3 constitutes a cathode 6. The electrolytic chamber 3 has an anode 5 in a plate form disposed therein on the side opposite the cathode 6 and is connected to the power source 12. The anode 5 is made of nickel, but may be made of stainless steel or suitable materials.

The reduction reaction chamber 4 has an introduction opening 10 (inlet) and a discharge opening 11 (outlet) in lower and upper parts thereof, respectively. The introduction opening 10 is connected, for example, to an excess anaesthetic-gas discharge apparatus, from which the waste gas may be introduced through the opening 10 or a liquid containing the nitrous oxide gas dissolved therein may be introduced through the opening 10. Either a gas or a liquid can be treated in this electrolytic cell. The gas or liquid which has been treated in this cell is discharged through the discharge opening 11. For increasing the contact efficiency between the nitrous oxide-containing gas or solution introduced into the reduction reaction chamber 4 and the porous catalyst layer 7, desirably, the gas or solution is forcibly circulated with a pump or stirred with a stirrer.

In an upper part of the electrolytic chamber 3 a gas outlet 9 is formed for discharging electrolytically generated gases, e.g., the anodic gas.

In reducing nitrous oxide using this electrolytic cell, the electrolytic chamber 3 is filled with an electrolytic solution 8 such as, e.g., an aqueous potassium hydroxide solution, and a voltage is applied to the anode 5 and the cathode 6 with the power source 12. As a result, hydrogen generates electrolytically on the cathode 6. This hydrogen is absorbed by the hydrogen-absorbing metal sheet 2 constituting the cathode 6, passes through the hydrogen-absorbing metal sheet 2, and reaches the porous catalyst layer 7 in the reduction reaction chamber 4. The hydrogen which has thus reached the catalyst layer comes into contact with the nitrous oxide-containing gas or solution introduced through the introduction opening 10 and reacts with the nitrous oxide to yield nitrogen and water. This reduction reaction is accelerated by the porous catalyst layer 7 disposed on the hydrogen-absorbing metal sheet 2 on the side facing the reduction reaction chamber 4.

An explanation of the above reaction mechanisms is as follows. In this electrolytic cell for reduction, when a voltage is applied to the cathode 6 and the anode 5 with the power source 12, the following electrolytic reaction occurs within the electrolytic chamber 3 to generate hydrogen atoms on the cathode 6.

$$H_2O + e^- \rightarrow H_{ad} + OH^- \quad (1)$$

The hydrogen atoms thus generated are adsorbed from the electrolytic chamber 3 onto the surface of the hydrogen-absorbing metal sheet (cathode) 2 and then absorbed, without being desorbed, in an inner part of the metal sheet 2.

$$H_{ad} \rightarrow H_{ab} \quad (2)$$

In the above formulae, Had represents adsorbed hydrogen and $H_{ab}$ represents absorbed hydrogen. The hydrogen atoms absorbed in an inner part of the hydrogen-absorbing metal sheet 2 diffuse within the metal sheet 2, pass therethrough in the thickness direction thereof, and come into a desorbable state on the side of the metal sheet 2 which faces the reduction reaction chamber 4.

The hydrogen atoms present in a desorbable state on the side of the metal sheet 2 which faces the reduction reaction chamber 4 come into contact with nitrous oxide to yield nitrogen and water. This reduction reaction is accelerated by the porous catalyst layer 7 disposed on the hydrogen-absorbing metal sheet 2 on the side facing the reduction reaction chamber 4.

When the hydrogen-absorbing metal sheet 2 having hydrogen atoms adsorbed or absorbed therein is brought into contact with nitrous oxide gas, the nitrous oxide is reduced to yield nitrogen and water according to the following formula.

$$N_2O + 2H^- \rightarrow N_2 + H_2O \quad (3)$$

The voltage application for the reduction of nitrous oxide is desirably conducted at an electrolytic current density such that the generation of hydrogen gas is not observed on the surface of the hydrogen-absorbing metal sheet 2. Specifically, the current density is preferably about from 0.1 to 10 A/dm², more preferably about from 1 to 5 A/dm². Current densities lower than 0.1 A/dm² are undesirable in that the reduction treatment requires too much time because such current densities are too low. The concentration of nitrous oxide in the gas or solution to be treated is also taken into account when finally selecting a current density.

Nitrous oxide may be introduced into the reduction reaction chamber 4 in the form of a solution prepared by dissolving a nitrous oxide-containing gas in water or a solvent such as an alcohol.

This electrolytic cell for nitrous oxide reduction is preferably constituted, for example, of the following materials.

The hydrogen-absorbing metal sheet 2 for use in the electrolytic cell is electrically conductive and serves as a stable cathode during electrolysis. It preferably has catalytic activity in the reduction reaction of nitrous oxide. Other desirable properties of the metal sheet 2 include: a reduced volume difference between the state containing hydrogen absorbed therein and the state containing no hydrogen; and the ability to repeatedly absorb and release hydrogen without becoming brittle. Typical examples of materials having such properties include palladium, which is a platinum group metal, palladium alloys and hydrogen-absorbing nickel alloys. Palladium is one of the most preferred metals because it not only has exceedingly high hydrogen permeability, but also has catalytic activity as well. Alloys of palladium with a small proportion of gold, silver, or aluminum hardly become brittle, and are suitable for most purposes. Other materials effective as the hydrogen-absorbing metal sheet in the present invention include alloys containing at least one rare earth element which are represented by lanthanum-nickel alloys and the so-called mischmetal, and further include titanium and zirconium alloys.

In general, the thickness of the hydrogen-absorbing metal sheet desirably is sufficiently small from the standpoint of enabling the reduction reaction to proceed efficiently. In order for the metal sheet to function as a cathode in electrolysis upon voltage application, it needs to have some degree of thickness. Although the desirable thickness range is generally about from 0.01 to 2 mm, a suitable thickness may be selected depending on the electrolytic conditions to be used.

The hydrogen-absorbing metal sheet serves not only to absorb hydrogen and enable the hydrogen to pass therethrough, but also as a feeder. Consequently, in the case where the metal sheet is to be used as part of industrial equipment, it is preferably constituted of a metal foil having a metal mesh or the like bonded to the back side thereof.

The catalyst layer formed on the hydrogen-absorbing metal sheet comprises a metal which is a catalyst participating in the reduction reaction. Examples of the catalyst include platinum group metals, especially palladium, platinum, iridium and ruthenium. Desirable catalysts are those which can be easily made to have a large surface area so as to increase the possibility of contact with the reactants in the nitrous oxide gas reduction. Preferred from this standpoint are platinum group metal blacks and gold. The most preferred is palladium black, especially palladium black having no gloss. The reasons for the preference of palladium are as follows. Palladium black has a large surface area and forms a catalyst layer having an exceedingly high catalytic activity in the reduction of nitrous oxide gas. In addition, palladium has the function of absorbing and desorbing hydrogen.

The present invention is described in more detail by reference to the following Examples, but it should be understood that the invention is not to be construed as being limited thereto.

EXAMPLE 1

A palladium sheet 2 having a thickness of 0.05 mm was inserted as a cathode 6 into a central part of the electrolytic cell 1 as an electrolytic apparatus illustrated in FIG. 1. Palladium black was deposited in an amount of 45 g/m$^2$ on the surface of the palladium sheet 2 facing the reduction reaction chamber.

A nickel plate having a thickness of 1 mm was disposed as an anode 5 in the electrolytic chamber 3 on the side opposite the cathode 6. A 6 M aqueous potassium hydroxide solution was introduced into the electrolytic chamber 3 as an electrolytic solution. The cathode had an electrode area of 2 cm$^2$. Nitrous oxide gas having a pressure of 1 atm was introduced into the reduction reaction chamber 4 as a substrate. The electrolytic cell 1 was then closed. A voltage was applied to the electrolytic chamber 3 to reduce the nitrous oxide gas under the following conditions.

Anode: nickel

Cathode: palladium sheet (thickness, 0.05 mm) with palladium black (45 g/m$^2$)

Current density: 1–5 A/dm$^2$

Temperature: room temperature

Substrate: N$_2$O (purity, 100%)

Figure 2:
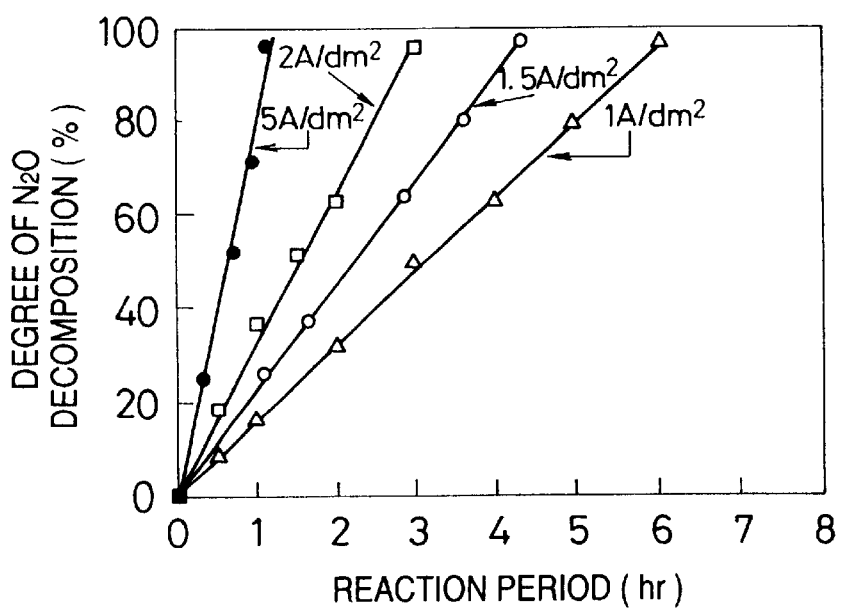
FIG. 2 is a graphic presentation illustrating changes in the degree of reduction of nitrous oxide gas.

FIG. 2 shows the degree of decomposition (degree of reduction) of nitrous oxide gas as a function of electrolysis period at different current densities.

Figure 3:
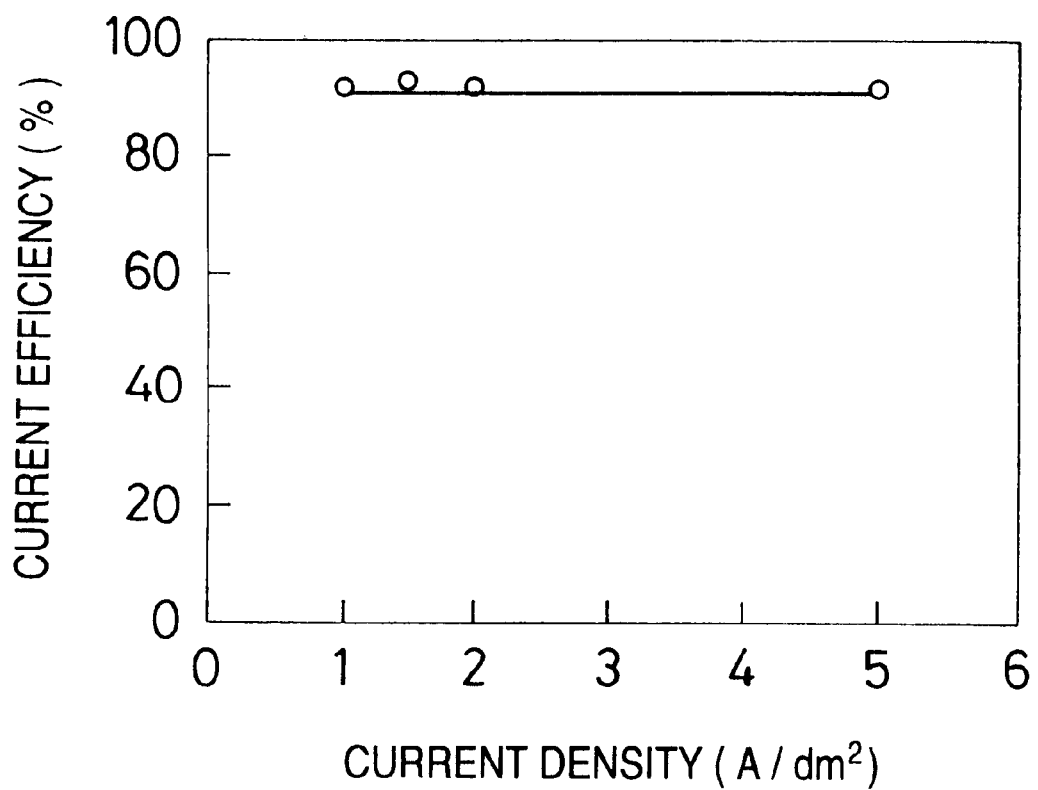
FIG. 3 is a graphic presentation illustrating the results of calculations of current efficiency.

At each current density, the degree of decomposition of nitrous oxide gas increased with increasing electrolysis period. The rates of nitrous oxide gas decomposition were determined from the slopes of the respective straight lines given in FIG. 2, while the theoretical decomposition rates were determined from the quantities of electricity applied. The current efficiencies in the reduction of nitrous oxide gas were calculated from those experimental and theoretical decomposition rates, and the results obtained are shown in FIG. 3. At each current density, the reduction reaction of nitrous oxide proceeded at a current density of 90% or higher. The only by-product on the electrolytic chamber 3 side was hydrogen, and the generation of nitrogen monoxide or nitrogen dioxide was not observed at all. This electrolytic cell was continuously operated for 50 days and then subjected to the same test. As a result, a current efficiency of 90% or higher was obtained at each current density, showing that the electrolytic cell could be operated stably over a long period of time.

COMPARATIVE EXAMPLE 1

The reduction of nitrous oxide gas was conducted in the same manner as in Example 1, except that the deposition of palladium black on the palladium sheet was omitted. As a result, hydrogen alone was generated on the electrolytic chamber 3 side and the reduction reaction chamber 4 side of the cathode. The reduction of nitrous oxide gas did not proceed at all.

EXAMPLE 2

The reduction of nitrous oxide gas was conducted in the electrolytic cell shown in FIG. 1 under the same conditions as in Example 1, except that a palladium sheet having platinum black deposited thereon in an amount of 50 g/m$^2$ on the reduction reaction chamber side was used as a cathode.

As a result, the amount of nitrogen provided as a reduction product increased linearly with increasing electrolysis period. The current efficiencies in the reduction reaction were determined from the slopes of these straight lines. As a result, the current efficiency at each current density was 80%. The remainder of the current was consumed by hydrogen generation on the electrolytic chamber 3 side.

EXAMPLE 3

The reduction of nitrous oxide gas was conducted in the electrolytic cell shown in FIG. 1 under the same conditions as in Example 1, except that an LaNi$_5$ sheet having palladium black deposited thereon in an amount of 45 g/m$^2$ on the reduction reaction chamber side was used as a cathode.

As a result, the amount of nitrogen provided as a reduction product increased linearly with increasing electrolysis period. The current efficiencies in the reduction reaction were determined from the slopes of these straight lines. As a result, the current efficiency at each current density was 60%. The remainder of the current was consumed by hydrogen generation on the electrolytic chamber 3 side.

COMPARATIVE EXAMPLE 2

The reduction of nitrous oxide gas was conducted in the same manner as in Example 1, except that the deposition of palladium black on the LaNi$_5$ sheet was omitted.

As a result, hydrogen alone was generated on the electrolytic chamber 3 side and the reduction reaction chamber 4 side of the cathode. The reduction of nitrous oxide gas did not proceed at all.

EXAMPLE 4

The reduction of nitrous oxide gas was conducted in the electrolytic cell shown in FIG. 1 under the same conditions as in Example 1, except that an MmNi$_{4.2}$Al$_{0.3}$Mn$_{0.5}$ {Mm represents a mischmetal (a general term for alloys having pyrophoric properties and consisting mainly of La, Ce, etc.)} sheet having palladium black deposited thereon in an amount of 45 g/m² on the reduction reaction chamber side was used as a cathode.

As a result, the amount of nitrogen provided as a reduction product increased linearly with increasing electrolysis period. The current efficiencies in the reduction reaction were determined from the slopes of these straight lines. As a result, the current efficiency at each current density was 70%. The remainder of the current was consumed by hydrogen generation on the electrolytic chamber 3 side.

EXAMPLE 5

The reduction of nitrous oxide gas was conducted in the electrolytic cell shown in FIG. 1 under the same conditions as in Example 1, except that an $MmNi_{4.2}Al_{0.3}Mn_{0.5}$ sheet having palladium black deposited thereon in an amount of 45 g/m² on the reduction reaction chamber side and further having platinum black deposited thereon in an amount of 100 g/m² was used as a cathode.

As a result, the amount of nitrogen provided as a reduction product increased linearly with increasing electrolysis period. The current efficiencies in the reduction reaction were determined from the slopes of these straight lines. As a result, the current efficiency at each current density was 90%. The remainder of the current was consumed by hydrogen generation on the electrolytic chamber 3 side.

EXAMPLE 6

A 6 M aqueous potassium hydroxide solution was introduced into the electrolytic chamber 3 of the electrolytic cell shown in FIG. 1 as an electrolytic solution. Nitrous oxide dissolved in ion-exchanged water in a concentration of 500 ppm was introduced into the reduction reaction chamber 4 as a substrate. A voltage was applied to the electrolytic chamber 3 to reduce the nitrous oxide gas. The electrolytic conditions used were the same as in Example 1.

As a result, even when nitrous oxide gas was used in the form of a solution in ion-exchanged water, the reduction reaction of the nitrous oxide proceeded at a current efficiency of 90% or higher at each current density as in Example 1. The remainder of the current was consumed by hydrogen generation on the electrolytic chamber 3 side. The generation of nitrogen monoxide or nitrogen dioxide as a by-product was not observed at all.

Because the present invention has the constitution described above, nitrous oxide can be reduced continuously and stably over a long period of time into nitrogen and water, which are harmless to the human body and the environment, without the need for catalyst replacement. Thus, the present invention provides a method for continuously and easily converting nitrous oxide stably over a long period of time into substances harmless to the human environment and the earth and an apparatus for practicing the method.

Unlike a conventional hydrogenation method in which a hydrogen-absorbing metal is used, the method of the present invention is free from hydrogen deficiency because hydrogen is continuously supplied electrolytically, and the reduction of nitrous oxide gas can be conducted continuously. Furthermore, the rate of nitrous oxide gas reduction can be controlled by regulating the current density in water electrolysis. Furthermore, because the method of treatment of the present invention utilizes a reduction reaction, the generation of nitrogen dioxide or nitrogen monoxide as a by-product does not occur at all.

Where nitrous oxide gas to be treated is introduced into the electrolytic cell for reduction of the present invention in the form of a solution in water or a solvent such as an alcohol, the nitrous oxide can be reduced without the need of adding a supporting electrolyte because electrical conductivity is imparted to the solution.

While the invention has been described in detail and with reference to specific embodiments thereof, it will be apparent to one skilled in the art that various changes and modifications can be made therein without departing from the spirit and scope thereof.

This application is based on Japanese Patent Application No. Hei. 10-300019 incorporated by reference.

What is claimed is:

1. A method of reducing nitrous oxide which comprises introducing nitrous oxide into a reaction chamber disposed in contact with an electrolytic chamber, said electrolytic chamber containing an electrolyte and having an anode and a cathode comprising a hydrogen-absorbing material, said cathode serving as a diaphragm separating said reaction chamber and said electrolytic chamber, electrolytically generating hydrogen on the cathode in said electrolytic chamber, and contacting the nitrous oxide with said diaphragm to thereby continuously reduce the nitrous oxide with hydrogen atoms electrolytically generated on the cathode, absorbed by said hydrogen-absorbing material and passing through said diaphragm to reach the reaction chamber.

2. The method of claim 1, wherein the cathode comprises a material selected from the group consisting of palladium, palladium alloys and hydrogen-absorbing nickel alloys.

3. The method of claim 1, wherein the cathode has a catalyst comprising a platinum group metal black deposited on the side of the cathode opposite the anode.

4. A method of reducing nitrous oxide contained in a gas or a liquid to be treated, using an electrolytic cell partitioned with a diaphragm into an electrolytic chamber and a reduction reaction chamber, said diaphragm comprising a hydrogen-absorbing material, said electrolytic chamber including an anode and containing an electrolyte, and the side of the diaphragm facing the electrolytic chamber serving as a cathode, which method comprises:

passing an electric current through the electrolytic chamber to generate hydrogen on the cathode, said hydrogen passing through the hydrogen-absorbing material to the side of the diaphragm facing the reduction reaction chamber, and introducing the gas or liquid to be treated into the reduction reaction chamber so as to contact the diaphragm and thereby reduce nitrous oxide contained in the gas or liquid to be treated with electrolytically generated hydrogen which has passed through the hydrogen-absorbing material.

5. The method of claim 4, which further comprises continuously introducing the gas or liquid to be treated into the reduction reaction chamber and discharging a treated gas or liquid from the reduction reaction chamber.

6. The method of claim 4, wherein the diaphragm has a catalyst comprising a platinum group metal black deposited on the side of the diaphragm facing the reduction reaction chamber.

7. The method of claim 6, wherein said catalyst comprises a porous layer.

8. The method of claim 4, wherein said diaphragm comprises a palladium sheet having palladium black deposited on the side of sheet facing the reduction reaction chamber.

9. The method of claim 4, wherein said reduction reaction chamber comprises an inlet and an outlet for introducing and discharging a gas or liquid into or from the reduction reaction chamber, and said electrolytic chamber comprises a gas outlet for discharging anodic gas.

10. The method of claim 4, wherein said hydrogen-absorbing material is selected from the group consisting of palladium, palladium alloys and hydrogen-absorbing nickel alloys.

* * * * *